Dec. 6, 1966   P. C. SHERBURNE   3,289,702
COVERINGS FOR CONDUITS
Filed Jan. 16, 1963   5 Sheets-Sheet 1

INVENTOR.
PHILIP C. SHERBURNE
BY David D. McKenney
ATTORNEY

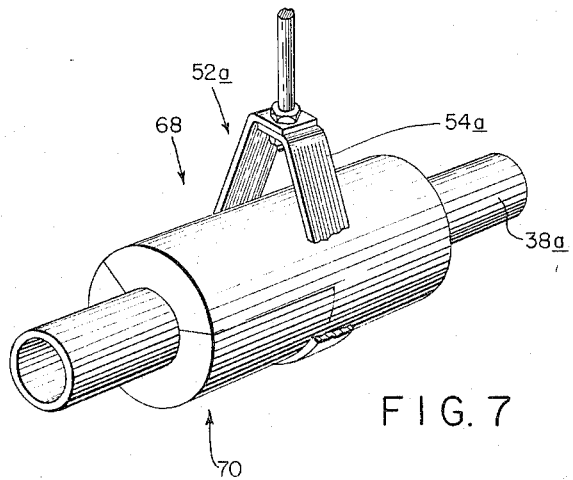
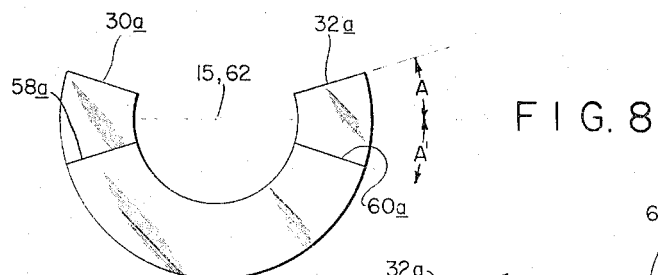
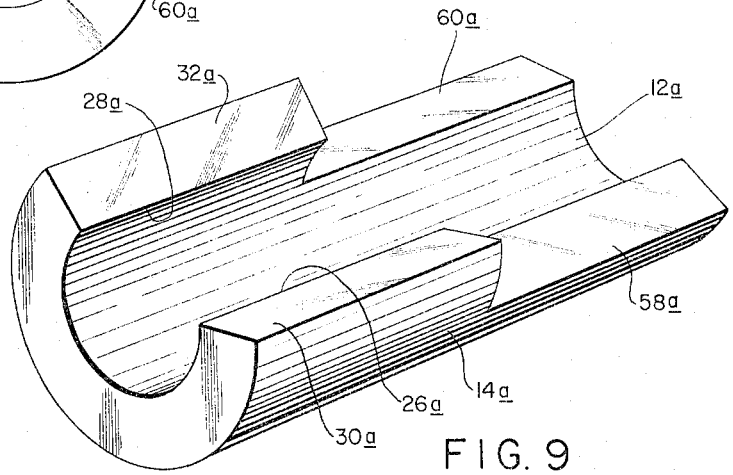

Dec. 6, 1966 P. C. SHERBURNE 3,289,702
COVERINGS FOR CONDUITS

Filed Jan. 16, 1963 5 Sheets-Sheet 4

INVENTOR.
PHILIP C. SHERBURNE
BY
ATTORNEY

Dec. 6, 1966  P. C. SHERBURNE  3,289,702
COVERINGS FOR CONDUITS
Filed Jan. 16, 1963  5 Sheets-Sheet 5
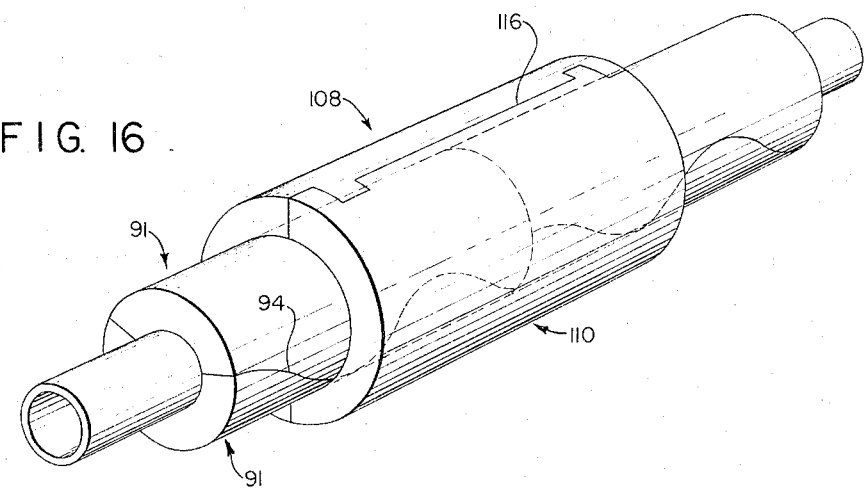
FIG. 16
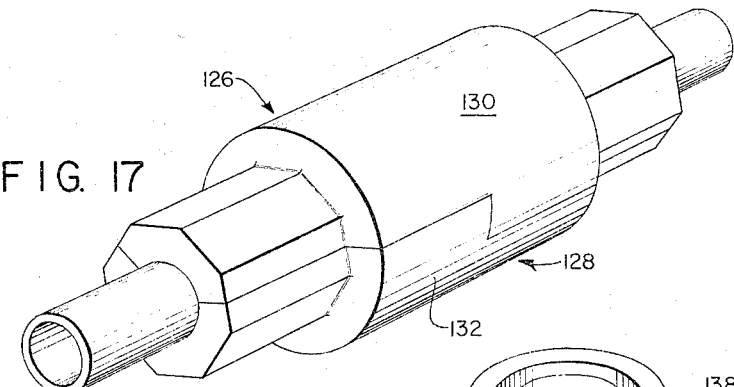
FIG. 17
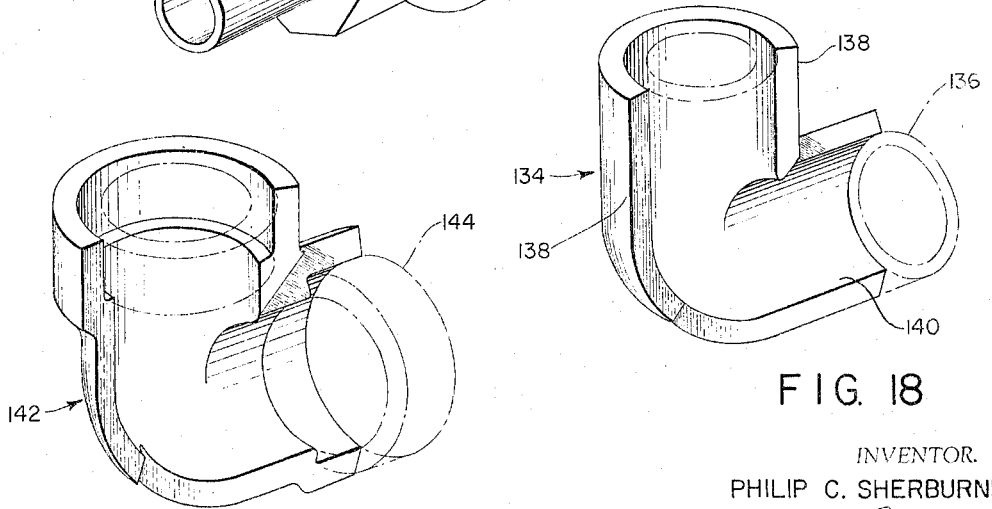
FIG. 18
FIG. 19
INVENTOR.
PHILIP C. SHERBURNE
BY
ATTORNEY 3,289,702
COVERINGS FOR CONDUITS
Philip C. Sherburne, Rumford, R.I., assignor to Grinnell Corporation, Providence, R.I., a corporation of Delaware
Filed Jan. 16, 1963, Ser. No. 251,963
4 Claims. (Cl. 138—118)

This invention relates to improvements in coverings for elongated and generally cylindrical objects. It has particular utility in the provision of heat insulation for conduits, for example it contemplates the use of pieces of pre-shaped insulation material which are adapted to snap onto piping or tubing. Such pieces are useful as mere insulation, but they are particularly advantageous at those locations along the conduit where hangers and like supports are located.

During the installation of conduits which require covering, for example refrigeration pipes requiring insulation, it is necessary to support the pipe at spaced intervals. This is customarily done by a variety of devices, the most common of which are hangers having depending loop portions to encircle the conduit and having connecting portions which connect the loop to overhead structure. Refrigeration piping presents special problems in that a complete vapor barrier and a complete covering of insulation is required to prevent the effects of atmosphere condensation. Since the pipe is usually installed before the covering is applied and must be supported in some manner before such application, and since the covering is preferably located between the pipe and the hanger loop portions when the installation is completed (for the reasons given above), it is desirable to apply at least a piece of the insulation covering to the pipe at each hanger location before the hanger is itself installed. Then after the hangers are all in place additional insulation can be applied to the pipe between the hangers and joined to the insulation piece at each hanger.

One problem associated with this installation has been the difficulty experienced by the workman in temporarily holding the piece of insulation (saddle) on the pipe while the hanger is being installed around this piece. Usually the pipe is being installed far above the ground or floor level so that the workmen are on ladders or scaffoldings, and it is not a simple task to hold the insulation saddle piece against the pipe and at the same time install the hanger around it.

The present invention overcomes this difficulty by providing a piece of resilient insulation which "clips" onto the pipe and is supported thereon against the force of gravity by embracing slightly more than half the pipe circumference. With such an arrangement the insulation piece can be secured to the pipe at any point therealong after the pipe sections have all been joined. In addition, these pieces can be quickly removed for relocation or they can be slid along the pipe for adjustment purposes after they have been clipped on.

Another problem with the earlier arrangements has been the difficulty in completely encircling the pipe with insulation at the hanger after the hanger loop portion has been installed around an insulation saddle piece which extends around less than the complete pipe circumference. Thus the presence of the hanger loop portion makes difficult the later application of ordinary forms of insulation to the top of the pipe in the vicinity of the hanger loop portion and down the sides of the pipe to such a saddle piece.

In one embodiment the present invention overcomes this difficulty by providing a second specially formed insulation cap piece which complements the saddle piece by completing the coverage of the pipe circumference. This cap piece has a circumferential extent less than half the pipe, but because it is usually located on the top side of the pipe it can be slipped into place and will stay there without special fastenings until the final insulation is applied, the latter usually being a wound tape which permanently holds the cap piece in place.

In another embodiment the present invention overcomes the difficulty of completing the pipe coverage by providing two pieces of insulation which are identical, which fit together around the pipe to form a completely encircling piece, each of which has a first portion embracing more than half the pipe, and each of which has a second portion complementing the first portion in that it extends around less than half the pipe. One advantage of this embodiment is that these two pieces of insulation can be clipped onto the pipe and fit together so that they form a completely encircling covering of insulation which stays in place against the actions of gravity and ordinary forces imposed while the hangers and the remaining insulation are being installed. Another advantage of this embodiment is that the covering pieces need to be formed in only one shape, so that if they are molded, for example, only one set of molds is required for a given conduit size and thickness of insulation. Another advantage is that such pieces of insulation lend themselves nicely to use for covering all parts of the pipe and not merely the locations at the hangers. Most embodiments of this invention have this feature, but where the pieces are identical each piece is clipped on and orientation of a larger piece to keep a smaller cap piece from falling off is not necessary.

Still another problem with the earlier arrangements has been the difficulty of correlating the pipe, insulation and hanger sizes. Since the hanger engages the insulation rather than the pipe it is necessary to achieve some kind of correlation between the diameters of the loops of the standard hangers available and the diameter of the outside surface of the insulation. This problem has been overcome in the present invention by the provision of insulation pieces which have inside diameters equal to the conventional outside pipe diameters and which have outside diameters also equal to larger conventional outside pipe diameters. Normally the insulation must be thicker than the differences between the outside diameters of pipes of adjacent sizes and accordingly the insulation of this invention preferably has a thickness equal to the difference between the outside pipe diameters of pipes which are not adjacent to each other in the series of available pipe sizes.

The advantage of this size relationship is that it permits the standard hangers to be used without special adapter saddles, and these hangers will fit against the outside of the insulation as they would against the pipe for which they were designed. At the same time insulation pieces which are sized in the manner described can be clipped on in layers to achieve as thick an insulation covering as desired, and finally the layers can be rotated with respect to each other and moved longitudinally with respect to each other so that the joints of the adjacent pieces in one layer do not register with the corresponding joints in another layer, whereby the insulation is not interrupted by gaps or cracks extending all the way from the pipe to the exterior surface of the insulation.

Accordingly, it is an object of the present invention to provide an insulation piece which has at least a portion fitting around slightly more than half of the circumference of a conduit, which is flexible enough to have this portion spread apart and snapped or clipped onto the conduit, and which is rigid enough to return to the shape the portion had before it was spread apart so that it remains clipped on the conduit against the force of gravity acting on the piece.

Another object is to provide an insulation piece of the kind described which has a cylindrical interior surface with a diameter equal to a conduit outside diameter and which has a cylindrical outside surface with a diameter equal to the outside diameter of a larger conduit.

Another object is to provide an insulation piece of the kind described in which the open side has a width only slightly less than half the conduit diameter.

Another object is to provide an insulation piece having along one part of its length a circumferential dimension which is larger than one half the circumference of the conduit by a certain slight amount and having along another part of its length a circumferential dimension which is smaller than one half the circumference of the conduit by the same said certain slight amount.

Another object is to provide an insulation cylinder having two parts each with at least one side edge width extends generally longitudinally, which fits together with the corresponding edge on the other part, and which passes at an angle through a plane including the cylinder axis.

Another object is to provide an insulation cylinder having two identical parts each with a pair of edges which extend generally longitudinally, which fit the corresponding pair of edges on the other part, which have substantial portions on one side of a plane including the cylinder axis and which have equal portions on the opposite sides of such plane.

Another object is to provide a combination of conduit and heat insulation in which the insulation comprises a plurality of pieces forming a novel laminar structure.

Another object is to provide a combination of the kind described in which the edges of one piece are staggered with respect to those of another over which it is fitted.

Other objects will appear hereinafter.

The best modes in which it is contemplated applying the principles of the present invention are shown in the accompanying drawings, but these are to be deemed primarily illustrative for it is intended to cover by suitable expression in the appended claims whatever patentable novelty exists in the invention disclosed.

In the drawings:

FIGURE 7 is a perspective view like FIG. 6 but showing a completed cylinder formed from two pieces like that of FIGS. 8 and 9;

FIGURE 8 is an end elevation view of a piece which has along one half of its length the structure of FIG. 1 and along the other half the structure of the cap piece shown in FIG. 6;

FIGURE 9 is a perspective view of the piece of FIG. 8;

FIGURE 16 is a perspective view of a laminar structure made from the pieces shown in FIGS. 13 and 15;

FIGURE 17 is a perspective view of an arrangement which illustrates that the piece need not be uniform in thickness and that the exterior surface need not be cylindrical; and FIGURES 18 and 19 are perspective views showing that the conduit being covered can be other than a straight cylindrical conduit.

Figure 1:
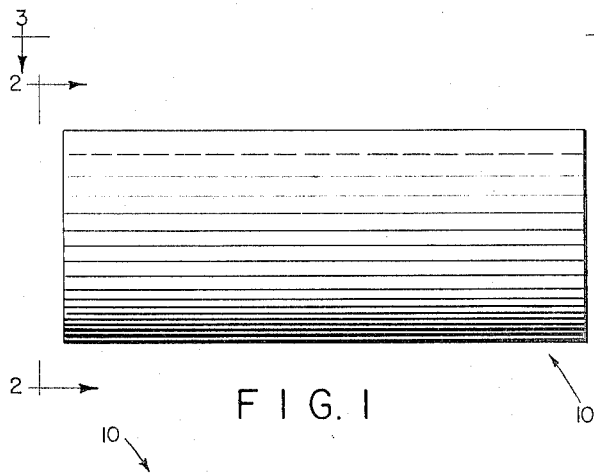
FIGURE 1 is a side elevation view of an insulation piece in accordance with the present invention.
Figure 2:
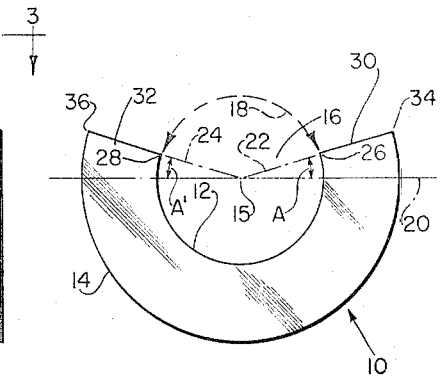
FIGURE 2 is an end elevation view taken on line 2—2 of FIG. 1.
Figure 3:
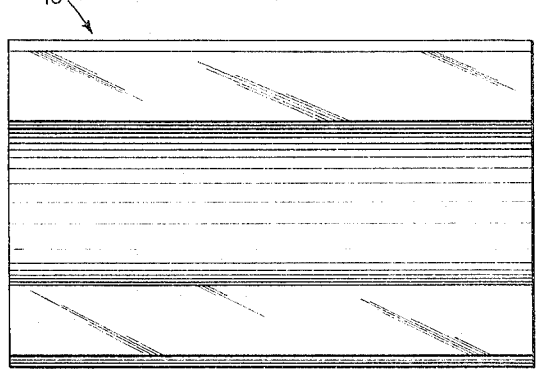
FIGURE 3 is a top plan view taken on line 3—3 of FIG. 1.

Referring now more particularly to the drawings, the embodiment of FIGS. 1–4 and 6 comprises a cylindrical section 10 of a light foam material, for example, urethane foam compound made by General Latex & Chemical Corp. of 666 Main Street, Cambridge, Massachusetts, and designated by that company as Formula—15–F–202 in its undated bulletin designated:

"Vultafoam Product Bulletin: Formula—15–F–202; type—halocarbon propelled blown polyether; density-core—1.6 lbs./cu. ft.; nominal—2.0 lbs./cu. ft."

This bulletin explains how to combine the ingredients provided by General Latex & Chemical Corp. to obtain the finished material and further describes the physical properties of this finished material. The above formula is a proprietary formula of General Latex & Chemical Corporation and therefore cannot be more specifically described.

The properties of this material which make it particularly suitable for the present invention are as follows: low density, non-flammable, non-fragile, slightly flexible, highly resistant to crushing, easily molded and easily cut in the field with simple hand tools. The "free blow" density (density obtained when the mixed ingredients are permitted to expand without restraint) is 8 pounds per cubic foot which provides excellent heat insulation properties and keeps the weight added to the conduit to a minimum. Resistance to the shocks of normal handling in shipment and during installation is important, and materials like the one above identified possess this property to a high degree. The desirability of slight flexibility and resistance to crushing will be understood as the description proceeds. The easy molding and easy cutting in the field for fitting are important considerations fulfilled by this type of material.

It will be understood, however, that the invention here resides in the shapes of the covering pieces, and although the above properties are desirable the invention can exist although one or all are considerably less marked than in the material above-mentioned. For example, the covering could be for a purpose other than insulation in which case the insulation properties would not be important.

The section 10 has a cylindrical interior surface 12 and a cylindrical exterior surface 14 concentric with the interior surface about an axis 15. A side of the section is open to provide a gap 16. With respect to the interior surface 12 the circumferential extent 18 of the gap is less than 180° by the sum of angles A and A', these angles being measured from a horizontal plane 20

(which includes the cylinder axis 15) to the radials 22 and 24 drawn to the edges 26 and 28 of the interior surface 12.

In this embodiment the side edge surfaces 30 and 32 lie in planes including the axis 15 and the edges 26 and 28, respectively, so that the radials 22 and 24 also pass through edges 34 and 36 of the outside surface 14, and the circumferences of both the interior and exterior surfaces extend the same number of degrees (180° A–A').

Figure 4:
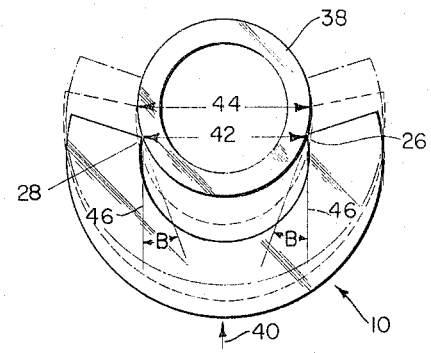
FIGURE 4 is a view like FIG. 2, but showing (in solid lines) the position of the piece just prior to its being clipped on a conduit, showing (in dotted lines) its position while it is being clipped on, and showing (in dot-dash lines) its final position.

In FIG. 4 the solid lines show the gap 16 of section 10 presented toward a conduit 38 with which section 10 is intended to be used as an insulation saddle. The outside diameter of conduit 38 equals the inside diameter of section 10. The edges 26 and 28 are in contact with the conduit surface. The dotted lines in FIG. 4 show section 10 after it has been pushed toward the pipe in the direction of arrow 40. Because the gap 16 is only slightly less than 180° in circumferential extent the distance 42 between edges 26 and 28 is only slightly less than the outside pipe diameter 44. Furthermore, the angles B between the conduit surface and the direction of movement of edges 24 and 26 are sufficiently small so that with modest effort the sides of section 10 are spread apart slightly. Further movement of the section in the direction of the arrow 40 permits the sides to spring back so that the section extends around the conduit and embraces it with the surface 12 in substantially continuous contact with the exterior surface of the conduit 38. The dot-dash lines show this final position. The amount of spreading of the sides is slight and the material of the piece is chosen so as to be fully able to deform this amount and return to its original shape.

Figures 5, 6:
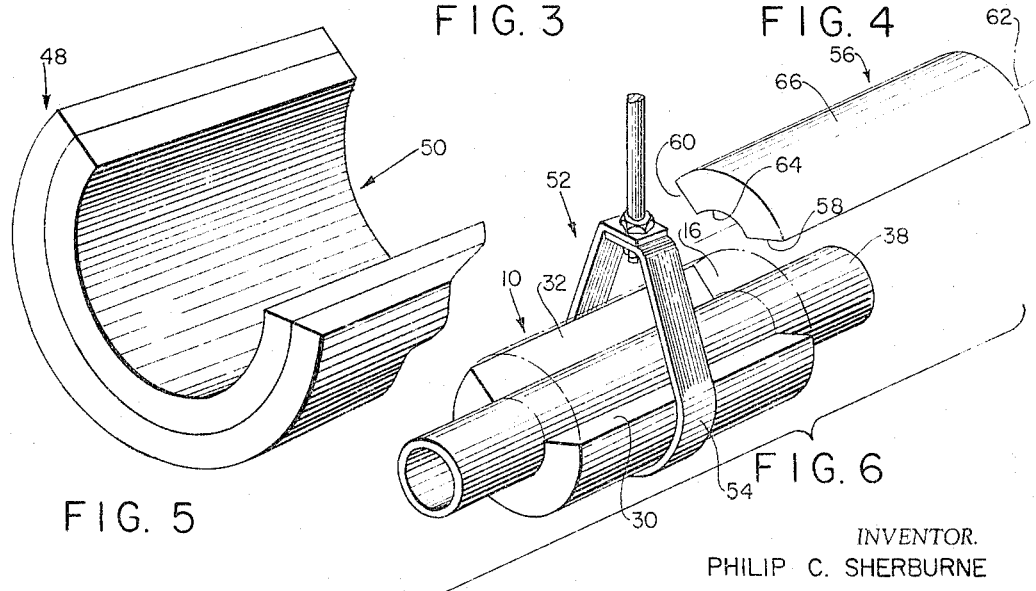
FIGURE 5 is a perspective view showing a laminar arrangement of two pieces each like the piece of FIG. 1.
FIGURE 6 is a partially exploded perspective view of the piece of FIG. 1 clipped onto a pipe and supported by a hanger. It also shows a complementary cap piece which (in solid lines) is in separated relation preparatory to the final location (dot-dash lines)

FIGURE 5 shows a pair of pieces 48 and 50 both like the piece 10 of FIG. 1, but in which one (48) is larger and fits over the other (50) in the same way that piece 10 fits over conduit 38. This arrangement permits the furnishing of a family of graduated sizes whereby the thickness of the covering can be increased by merely adding additional layers rather than by making the insulation pieces in a wide variety of thicknesses for each internal diameter.

In FIG. 6 the insulation saddle piece 10 of FIG. 1 is shown on the conduit 38 and with a pipe hanger 52 installed thereon. The hanger loop 54 embraces the outside surface 14 of the piece with the gap 16 uppermost. Also in this view a cap piece 56 is shown (in solid lines) ready to be placed in final position and is shown (in dot-dash lines) in final position on the conduit 38. This cap piece is the same thickness as the piece 10 and complements the piece 10 in enclosing the conduit. In addition, the side edge surfaces 58 and 60 of the cap piece are in radial planes with respect to the axis 62 of the cap piece's inner and outer cylindrical surfaces 64 and 66. As a result these side edge surfaces fit in substantially continuous engagement with the corresponding side edge surfaces 30 and 32 on the piece 10. Cap piece 56 can be slipped into place within the hanger loop 54 after the hanger has been installed, and since the gap 16 in piece 10 is preferably uppermost cap piece 56 stays in place until a final insulation wrapping of tape or the like is applied.

FIGURE 7 shows another embodiment in which the two pieces of insulation 68 and 70 are identical, one half end of each being like piece 10 of FIG. 1 and the other half end (integral with the first-mentioned half end) being like the cap piece 56 of FIG. 6. With this arrangement both pieces 68 and 70 have the clip-on feature at their end which is like piece 10, and this has the advantage that no particular care need be taken to have either piece 68 or 70 upper-most to prevent its falling off the conduit. In FIGS. 8 and 9 the same numerals have been used as in FIGS. 1 to 4 and 6, but with the letter a added.

Although the arrangement of FIGS. 7–9 is directed primarily to insulation saddles for hangers, the clip-on feature is such an advantage that pieces like 68 and 70 can be used anywhere on the pipe as a convenient, quickly applied insulation. The pieces are identical so that only one kind need be furnished, simplifying manufacturing and supply problems, and in addition they can be applied in pairs at one point on the pipe and pushed along by the next pair without danger of their falling off.

Figure 10:
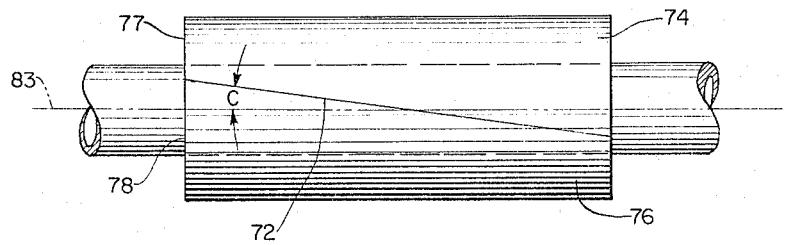
FIGURE 10 is a side elevation view of an insulation cylinder which is disposed around a conduit and which is formed of two identical pieces having a different edge surface configuration than that of FIG. 7.

Preferably the pieces like 68 and 70 of FIGS. 7–9 are made by molding with the result that the configuration of the side edge surfaces 30a, 32a, 58a and 60a can be easily provided. It may happen, however, that it is easier or cheaper to first make a complete cylinder of insulation material and then cut it in half to provide the desired side edge surfaces 72. In such event the arrangement of FIGS. 10 and 11 may be preferred, because the cut 72 can be straight, and still the two pieces 74 and 76 will be identical. Each piece has the clip-on feature over a portion of its length, because the side edge surfaces 72 are in a plane which forms a slight angle C with the axis 83 of the cylinder. Accordingly, one end of each piece (74 or 76) wraps around slightly more than one half of the conduit.

Figure 11:
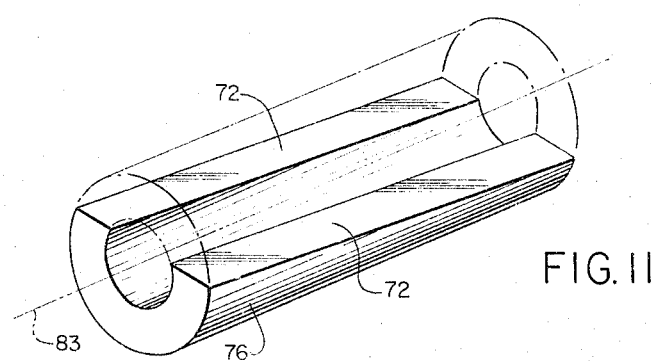
FIGURE 11 is a perspective view showing one of the pieces of FIG. 10 in solid lines and the other piece in dot-dash lines.
Figure 12:
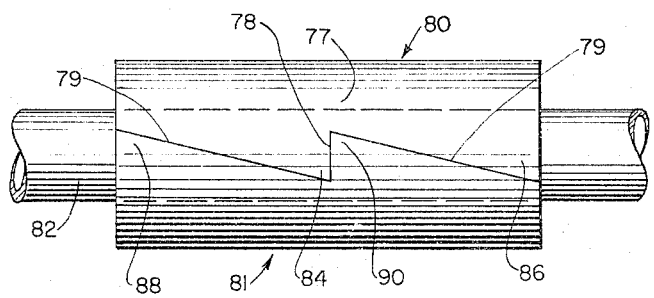
FIGURE 12 is a view like FIG. 10 but showing an embodiment with another edge surface configuration.

Each piece in the embodiment of FIG. 12 is in effect two pieces like FIG. 11 with the small end 77 of one joined to the large end 78 of the other. This provides side edge surfaces 79 which are so shaped that each of the pieces 80 and 81 has two spaced apart portions which clip onto the conduit 82. More particularly, piece 80 has portions 84 and 86 which extend beyond the 180° point, and similarly piece 81 has corresponding portions 88 and 90.

Figure 13:
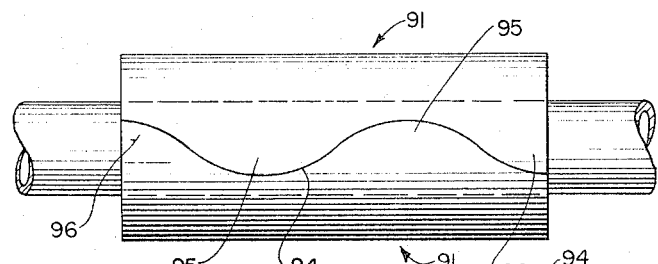
FIGURES 13 and 14 are views like FIG. 10, but showing an embodiment with still another edge surface configuration and a novel interlocking arrangement for a plurality of these pieces.
Figure 13A:
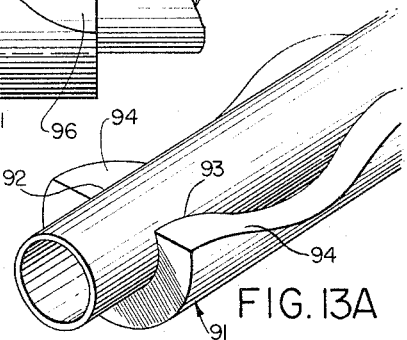
FIGURE 13A is a fragmentary perspective view of one of the pieces of FIG. 13 on the conduit.
Figure 14:
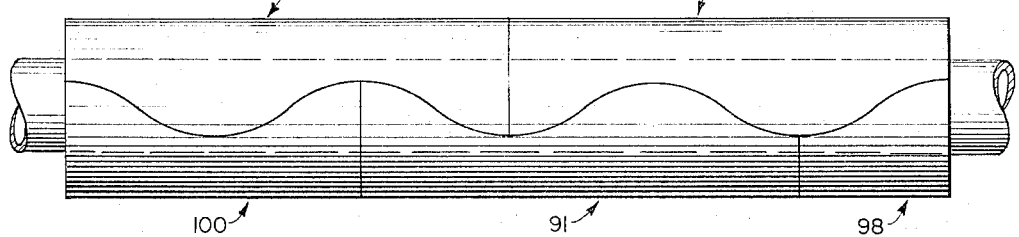

FIGS. 13, 13A and 14 show pieces 91 in which edges 92 and 93 (corresponding to edges 26 and 28 of FIG. 2) and the side edge surfaces 94 follow gradual curves, for example a sine wave. Here again each piece has two portions 95 and 96 which extend over slightly more than 180° and clip onto the conduit. FIGURE 14 illustrates how these pieces 91 can be staggered by turning every other one end-for-end to produce an interlocking arrangement. In addition, FIGURES 14 shows that the pieces can be cut to form smaller pieces 98 and 100 which will square off the insulation when the principle pieces 91 are staggered.

Figure 15:
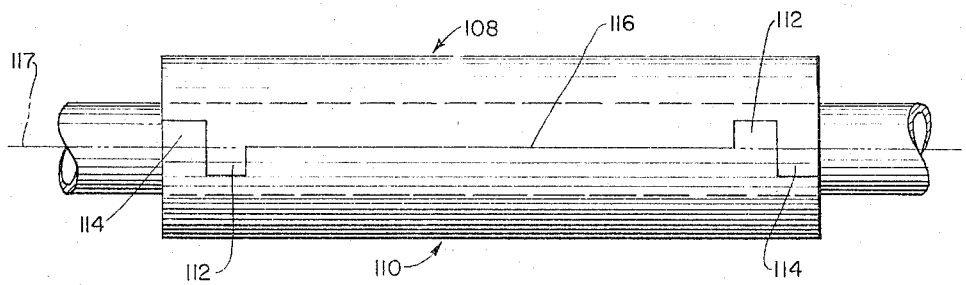
FIGURE 15 is a side elevation view of a laminar arrangement which might be used for relatively long pieces of insulation.
Figure 15A:
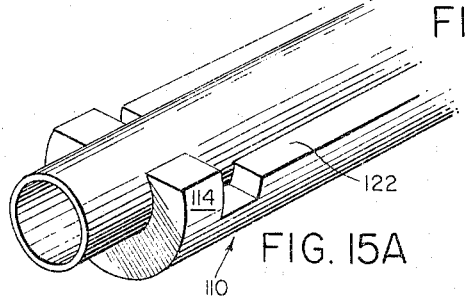
FIGURE 15A is a fragmentary perspective view of one of the pieces of FIG. 15 on the conduit.

FIGURES 15 and 15A show how a pair of pieces 180 and 110 can each have clip-on portions 112 and 114 at its ends and at the same time have "neutral" side edges 116 over a substantial part of the length of the piece. These side edges are "neutral" in the sense that they both lie in a plane including the axis 117. The advantage of this is that such pieces can have substantial length, and at the same time the clip-on portions are not so long that great force is needed to push the piece into place. Another advantage is that the clip-on portions for each piece are at each end so that the clip-on portion at one end is not relied upon to support the entire piece in place against the action of gravity.

FIG. 16 also shows a multi-layer arrangement in which the inner layer is of the FIG. 13 type and the outer layer is of the FIG. 15 type. By rotating the side edges 116 of the outer layer about 90° from the edge surfaces 94 of the inner layer, there are no extended crevices or cracks extending directly to the conduit from the outer-most insulation surfaces.

FIGURE 16 is a view like FIG. 7 but showing the exterior surfaces of the pieces 126 and 128 may have a non-cylindrical shape and that the exterior surface need not have the same configuration along its length. Thus, in this showing the exterior surface of each piece has a built-up cylindrical portion 130 and 132 which enables a large pipe hanger to be employed.

FIGURES 18 and 19 show that this invention is not limited to coverings for straight cylindrical conduits. Thus FIG. 18 shows how an insulation piece 134 would be shaped for a welded fitting elbow 136 shown in dot-dash lines. As in the other cases, one end of the piece has the clip-on portion 138 and the other end is shaped at 140 to complement the clip-on portion of another identical piece not shown.

FIGURE 19 shows how the insulation piece 142 would be shaped for a fitting of non-uniform external diameter, for example a cast elbow 144 shown in dot-dash lines.

I claim:
1. A snap-on two piece, preformed, insulating cover for a length of pipe comprising:
    (1) two substantially, semi-cylindrical complementary sections joined about said pipe to form a uniformly thick cylindrical cover composed of a rigid and slightly flexible insulating material whose interior surface is substantially wholly in contact with said pipe, each section including:
        (A) two longitudinally extending edge portions, each for abutting engagement with an adjacent edge portion of the other section:
            (1) at least a part of said two edge portions being spaced apart a chord distance less than the outside diameter of said pipe and the angular circumferential extent of the interior surface of said cylindrical cover at said part being slightly greater than 180°,
            (2) each of said parts of said edge portions being non-reentrant in configuration and in abutment with corresponding non-reentrant segments of the adjacent section, which segments contain an interior surface with a circumferential angular extent of slightly less than 180°, the total angular extent of the interior surfaces of each part and its abutting segment being 360°.
whereby each of the two said sections may be snapped onto said pipe and held thereon by engagement with the pipe in abutment with each other to form a complete cylindrical cover about said pipe.

2. A snap-on two piece insulating cover as called for in claim 1 wherein said non-reentrant parts and corresponding non-reentrant segments are respectively smoothly rounded peaks and valleys whereby the two edge portions of each section has a smoothly undulating configuration with maximum limits on both sides of an imaginary plane containing the longitudinal axis of said cylindrical cover.

3. A snap-on two piece insulating cover as called for in claim 1 wherein said non-reentrant parts and corresponding non-reentrant segments are respectively rectangular matching tongues and notches having maximum extensions on both sides of an imaginary plane containing the longitudinal axis of said cylindrical cover.

4. A snap-on two piece insulating cover as called for in claim 1 wherein said non-reentrant parts and corresponding on-reentrant segments are of a saw-tooth configuration having respectively sharp peaks and valleys on both sides of an imaginary plane containing the longitudinal axis of said cylindrical cover.

References Cited by the Examiner

UNITED STATES PATENTS

| | | | |
|---|---|---|---|
| 651,425 | 6/1900 | McConnell | 154—44 |
| 1,105,844 | 8/1914 | Schaperjahn | 154—44 |
| 1,355,083 | 10/1920 | Marsh | 154—44 |
| 2,602,764 | 7/1952 | Billingham | 154—44 |
| 2,761,443 | 9/1956 | Parker | 154—44 X |
| 2,778,405 | 1/1957 | Stephens et al. | 154—44 X |
| 2,784,129 | 3/1957 | Stephens | 154—44 |
| 2,855,021 | 10/1958 | Hoppe | 154—150 |

LAVERNE D. GEIGER, *Primary Examiner.*

MORRIS SUSSMAN, *Examiner.*

H. ARTIS, *Assistant Examiner.*